United States Patent [19]

Ikuma

[11] Patent Number: 5,537,376

[45] Date of Patent: Jul. 16, 1996

[54] DISK CARTRIDGE LOADING MECHANISM

[75] Inventor: Susumu Ikuma, Tokyo, Japan

[73] Assignee: Canon Kabushiki Kaisha, Tokyo, Japan

[21] Appl. No.: 220,547

[22] Filed: Mar. 31, 1994

[30] Foreign Application Priority Data

Mar. 31, 1993 [JP] Japan .................................. 5-095008
Mar. 29, 1994 [JP] Japan .................................. 6-058630

[51] Int. Cl.$^6$ ......................... G11B 17/022; G11B 17/04
[52] U.S. Cl. .................... 369/77.2; 369/75.2; 360/99.06
[58] Field of Search ................................ 369/75.1, 75.2, 369/77.1, 77.2; 360/99.06, 99.07, 99.02, 99.03

[56] References Cited

U.S. PATENT DOCUMENTS

| | | | |
|---|---|---|---|
| 4,396,963 | 8/1983 | Wright .................................. | 360/99.06 |
| 4,539,614 | 9/1985 | Thompson ........................... | 369/270 X |
| 5,113,297 | 5/1992 | Yoshida ................................ | 360/99.06 |
| 5,119,252 | 6/1992 | Kamata et al. ...................... | 360/99.06 |
| 5,231,623 | 7/1993 | Kunno et al. ........................ | 369/75.2 |
| 5,341,357 | 8/1994 | Mukawa et al. ..................... | 369/75.2 |

*Primary Examiner*—Stuart S. Levy
*Assistant Examiner*—William J. Klimowicz
*Attorney, Agent, or Firm*—Fitzpatrick, Cella, Harper & Scinto

[57] ABSTRACT

An optical information recording/reproducing apparatus is provided for recording information with an optical beam in an optical information recording medium enclosed in a cartridge and/or reproducing the information therefrom. The apparatus includes a holder for holding the cartridge to be inserted thereinto, a slide plate for moving the holder between a position where the slide plate receives the cartridge to be inserted into the apparatus and a position where the cartridge is loaded at a predetermined position in the apparatus, an optical head for irradiating the optical beam onto the optical information recording medium in the cartridge to record and/or reproduce information, and a restricting device for restricting movement of the slide plate during recording and/or reproducing information by the optical head. In one embodiment, the apparatus may further include a magnetic head for applying a modulation magnetic field according to the information to the recording medium and a floating slider for supporting the magnetic head to be capable of floating relative to the recording medium, in which the restricting device restricts the movement of the slide plate while the magnetic head is landing on the recording medium.

2 Claims, 12 Drawing Sheets

5,537,376

DISK CARTRIDGE LOADING MECHANISM

BACKGROUND OF THE INVENTION

1. Field of the Invention

The present invention relates to an optical information recording apparatus which performs at least one of recording and reproduction of information with an optical beam in or from an optical information recording medium enclosed in a cartridge such as an optical disk or a magneto-optical disk. More particularly, the invention relates to a disk cartridge loading mechanism in such apparatus.

2. Related Background Art

FIG. 1 and FIG. 2 show a conventional example of such a disk cartridge loading mechanism in an optical information recording/reproducing apparatus. As shown in FIGS. 1 and 2, the disk cartridge loading mechanism is so constructed that a cartridge 2 enclosing a disk recording medium 1 (hereinafter referred to simply as a disk) is vertically moved up and down by a cartridge holder (hereinafter referred to simply as a holder) 4 between an insertion position (up position) where the cartridge 2 is to be horizontally inserted into the holder in the direction of arrow a and a loaded position (down position) where the disk 1 in the inserted cartridge 2 is to be loaded onto a disk table. In this arrangement, four rollers 4a are provided on the side surfaces of holder 4 as to be engaged with associated slope portions 3e in a guide cam 3 which moves in the directions of arrows a–a'. Here, the guide cam 3 is always urged by an unrepresented spring in the direction of arrow a'.

In loading the cartridge 2 it is inserted and pressed in through a cartridge slot 22a on a front panel 22, as shown in FIG. 2, whereby a leading end of cartridge 2 rotates a trigger arm (not shown) restricting a motion of the guide cam 3. This releases the restriction of guide cam 3, so that a spring force moves the guide cam 3 in the direction of arrow a'. During this operation a shutter of the cartridge is arranged to open with the insertion of cartridge 2 by a lever set on the holder 4, though not shown. The rollers 4a on holder 4 are guided into the associated slope portions 3e provided in the moving guide cam 3, and with descent of holder 4, the disk 1 in cartridge 2 is loaded on a turntable of spindle motor 5. Once the disk 1 is loaded on the turntable as described, the disk 1 is rotated with rotation of the turntable and a movement control is started for a carriage 6 on which a light pickup 7 and a floating or flying magnetic head 10 as an external magnetic field generating device are mounted. Information is recorded or reproduced using the light pickup 7 and the magnetic head 10 under the movement control (see FIG. 1).

In this case, the floating magnetic head 10 is supported on a support arm 9 so that it is rockable in the directions of arrows d–d' about a fulcrum 6a set behind the carriage (or ahead of the cartridge in the insertion direction) and is always urged by a torsion spring 11 in the direction d. A projecting portion 9a is provided behind the support arm 9 as being restricted in operation by an unrepresented mechanism such as a solenoid (at the position in FIG. 2). Then, with energization of the solenoid the operation restriction is released to allow landing of the magnetic head onto the disk (see FIG. 1). Namely, the mechanism is so arranged that if a power supply is interrupted to the drive power source, the energization of the solenoid 12 is automatically interrupted so as to withdraw the magnetic head 10 from the disk 1.

In ejection of the cartridge 2 the energization of the solenoid 12 is first stopped to withdraw the magnetic head 10 from the disk 1. After that, the spindle motor 5 is stopped and an eject motor 17 is activated to rotate so that a bent-down piece 3d formed from the guide cam 3 is driven in the direction of arrow a to move the guide cam 3 so as to raise the holder 4 from the loaded position to the insertion position by the reverse operation as opposite to the loading operation. Then the cartridge 2 is pushed out of the holder 4 while closing the shutter by the unrepresented lever (returning to the state of FIG. 2). As described, the ejection operation of cartridge 2 is carried out by driving the eject motor 17 under a control command of a control circuit. In a case that some anomaly occurs in the drive device and the control system thereof because of interruption of service during operation and therefore that the eject motor 17 cannot be used for the ejection, a mechanism permitting a manual operation is preliminarily prepared for forcibly ejecting the cartridge manually. For example, the mechanism is so arranged that a hole 22b for insertion is perforated through the front panel 22, a forcible ejection tool 18 is inserted through the hole, the tool is brought into contact with a bent-down portion 3b of guide cam 3, and the guide cam 3 is forced to move in the direction of arrow a, ejecting the cartridge 2 manually.

There is another type of disk cartridge loading mechanism using no eject motor for the ejection of the disk cartridge, which is arranged to eject the cartridge by manually pressing an ejection button exposed to the outside of a apparatus thereinto. This type of mechanism is popularly used as a loading mechanism of floppy disk. In this type of mechanism the guide cam is not moved by a motor but by hand. The basic operation is the same as in the forced ejection.

Incidentally, the conventional disk cartridge loading mechanism as shown in FIGS. 1 and 2 is arranged on the assumption that the drive power source is in an off state upon the manual forced ejection of the cartridge as being described. The forced ejection mechanism shown in this conventional example is, however, arranged as operable even in any state of the drive. Even if a user should erroneously insert the forcible ejection tool through the slot in the front panel during recording or reproduction, the guide cam would move even during high-speed rotation of the disk and during landing of the magnetic head, which would raise the cartridge to eject it. With this erroneous operation, the cartridge shutter will be shut during the ejection, so that the shutter could damage the magnetic head. Also, the thus damaged magnetic head would be again landed onto the disk, which could raise the worst case, for example, destruction of the drive, and further data crash. In addition, the disk rotating at a high speed could collide with the internal wall of the cartridge case during the forced ejection, which could destroy the disk.

Also in the case of the mechanism for ejecting the disk cartridge manually, it is arranged as being operable irrespective of the condition of the drive power source. If the ejection is to be forced during data recording into the medium, a laser beam in a recording operation would cross tracks on the medium, which could destroy the data on the disk or even the disk itself, as described above.

SUMMARY OF THE INVENTION

It is thus an object of the present invention to provide an optical information recording/reproducing apparatus solving the above problems.

The above object can be achieved by an optical information recording/reproducing apparatus for recording information with an optical beam in an optical information recording medium enclosed in a cartridge and/or reproducing the information therefrom, comprising:

a holder for holding the cartridge to be inserted into the apparatus;

an optical head for irradiating the optical information recording medium in the cartridge with the optical beam to record and/or reproduce information;

a slide plate adapted to move within the apparatus so as to eject the cartridge held by the holder from the apparatus; and restricting means for restricting movement the slide plate during recording and/or reproducing information by the optical head.

DETAILED DESCRIPTION OF THE PREFERRED EMBODIMENTS

Figure 1:
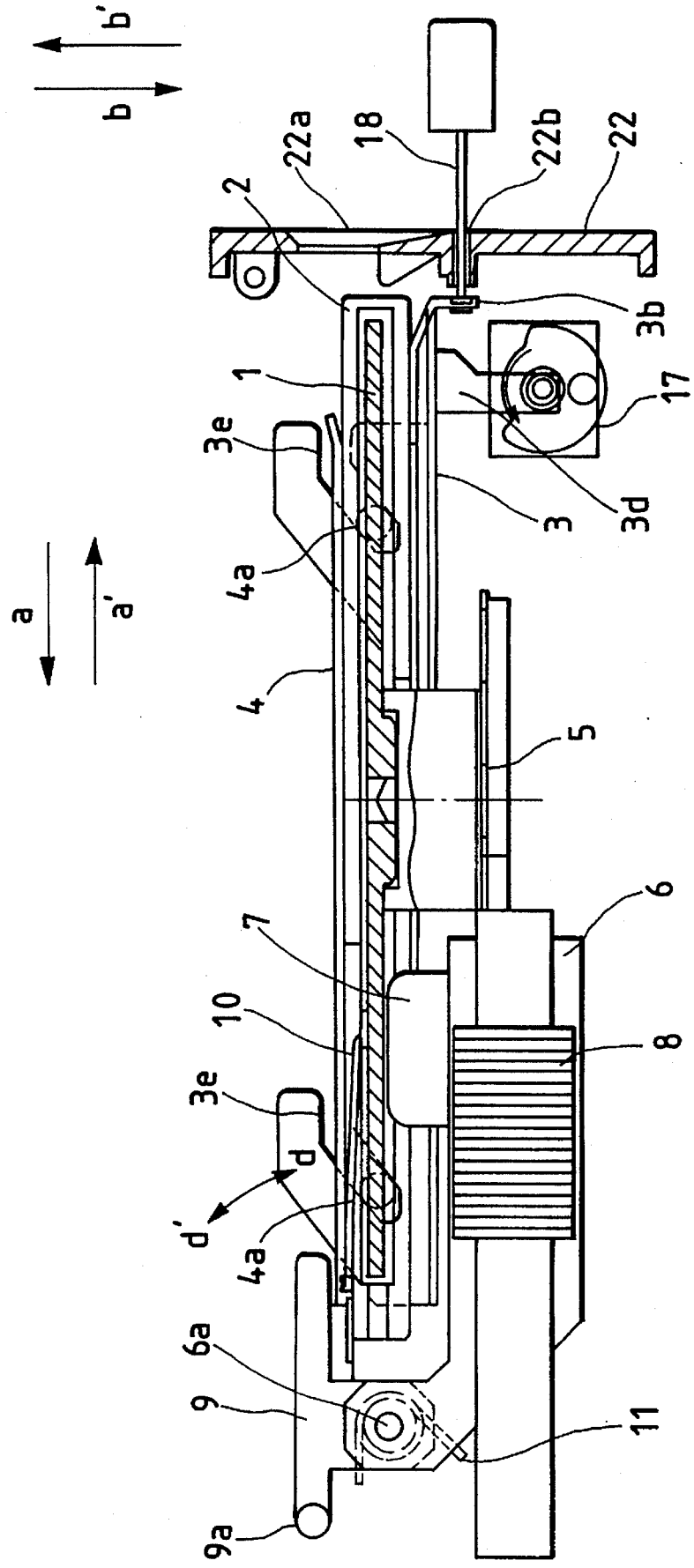
FIG. 1 is a side view of a disk cartridge loading mechanism with a cartridge loaded in a conventional example.
Figure 2:
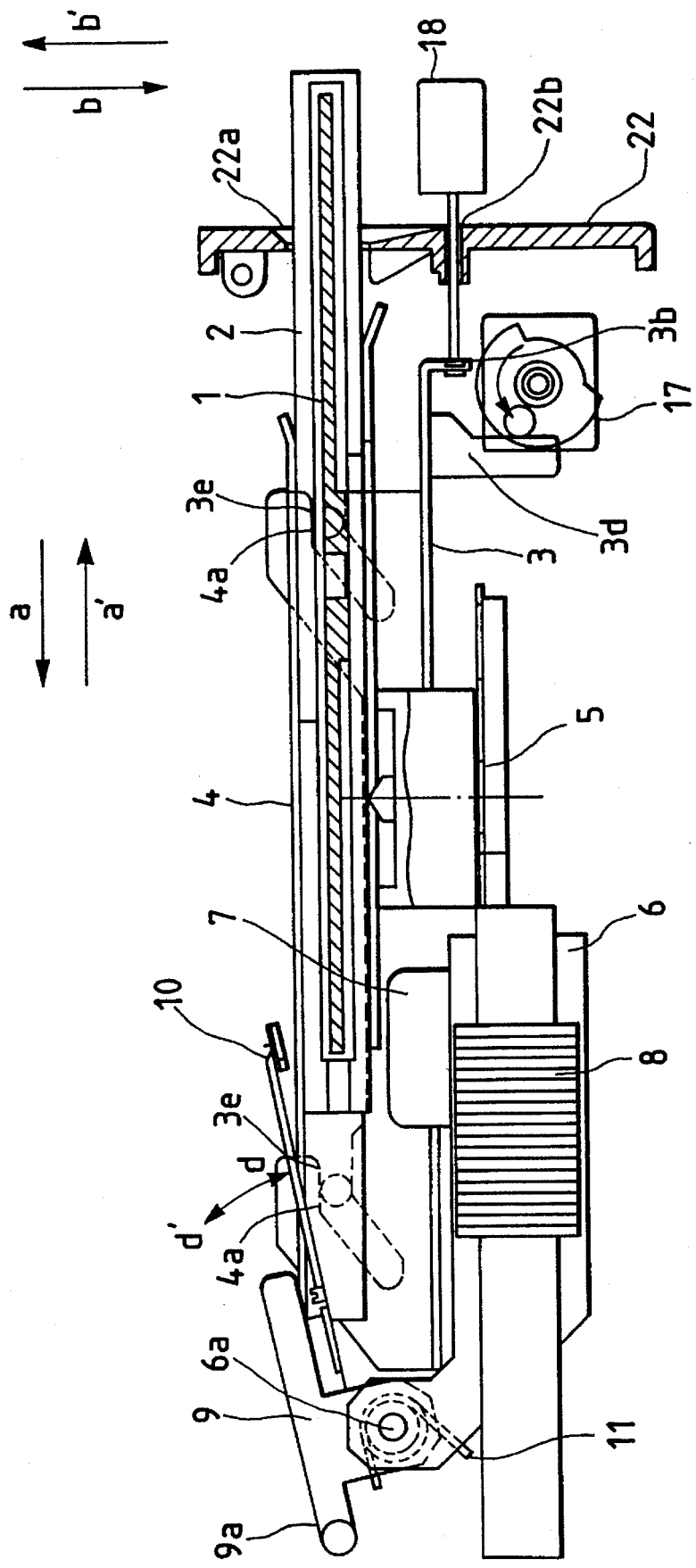
FIG. 2 is a side view of the disk cartridge loading mechanism before loading of a cartridge or after ejection of a cartridge in the conventional example.
Figure 3:
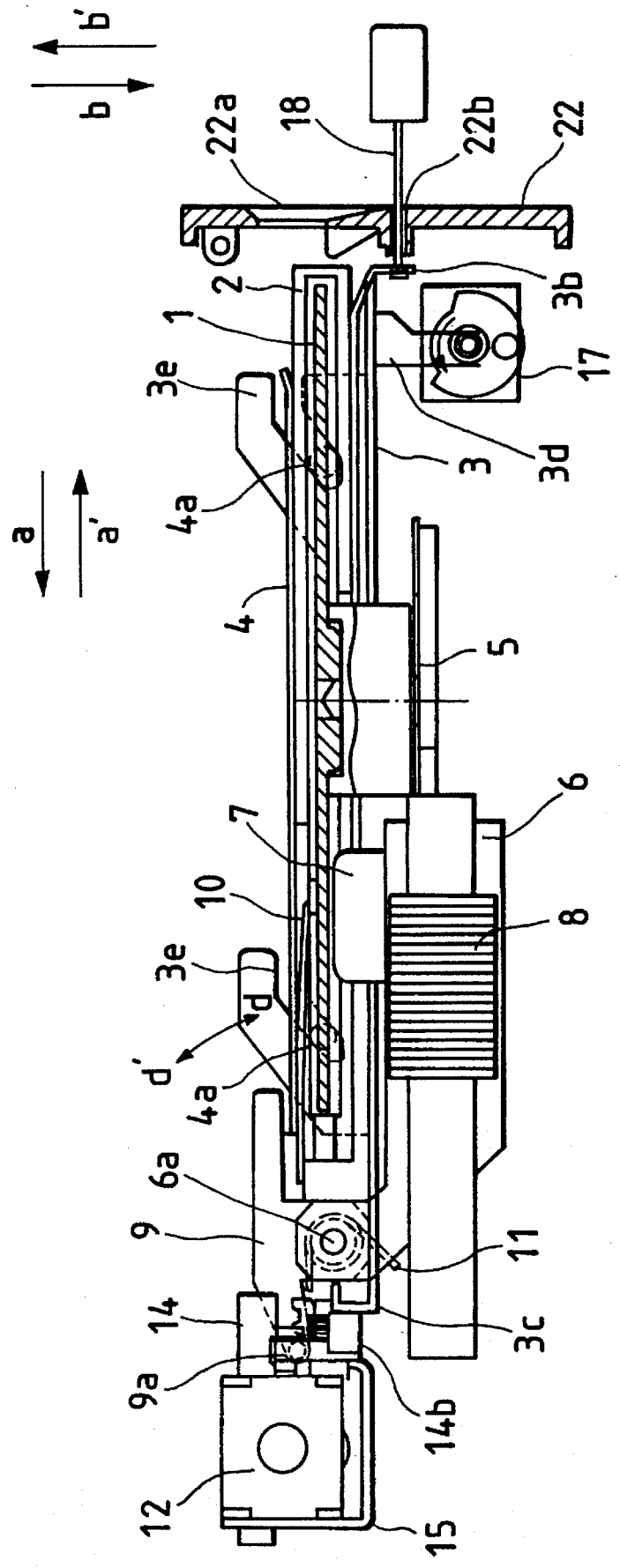
FIG. 3 is a cross-sectional view of a disk cartridge loading mechanism with a cartridge loaded in an optical information recording/reproducing apparatus in a first embodiment of the present invention.

The first embodiment of the optical information recording/reproducing apparatus according to the present invention will be described in detail with reference to FIG. 3 to FIG. 8. In FIG. 3, reference numeral 1 designates a disk (disk recording medium), and 2 a cartridge in which a disk 1 is enclosed and on which a shutter (not shown) is slidably supported. Also, numeral 3 denotes a guide cam for moving a holder up and down during loading or ejection of the cartridge 2, which is set to engage with four positioning pins 21 fixed on a chassis (not shown) as being supported slidable in the directions of arrows a–a', as shown in FIG. 5, and which is always biased by two tension coil springs 23 in the direction a' (or in the cartridge ejection direction). Also, movement of the guide cam 3 is restricted by a trigger arm 19 which can rotate about a pivot set on the chassis. In the drawings, numeral 20 denotes a spring for urging the trigger arm in the direction e', and numeral 4 a holder which is vertically moved between an insertion position (up position) where the cartridge 2 is to be horizontally inserted in the direction of arrow a (in the cartridge insertion direction) and a loaded position (down position) where the disk 1 in the inserted cartridge 2 is loaded on a turntable.

Figure 7:
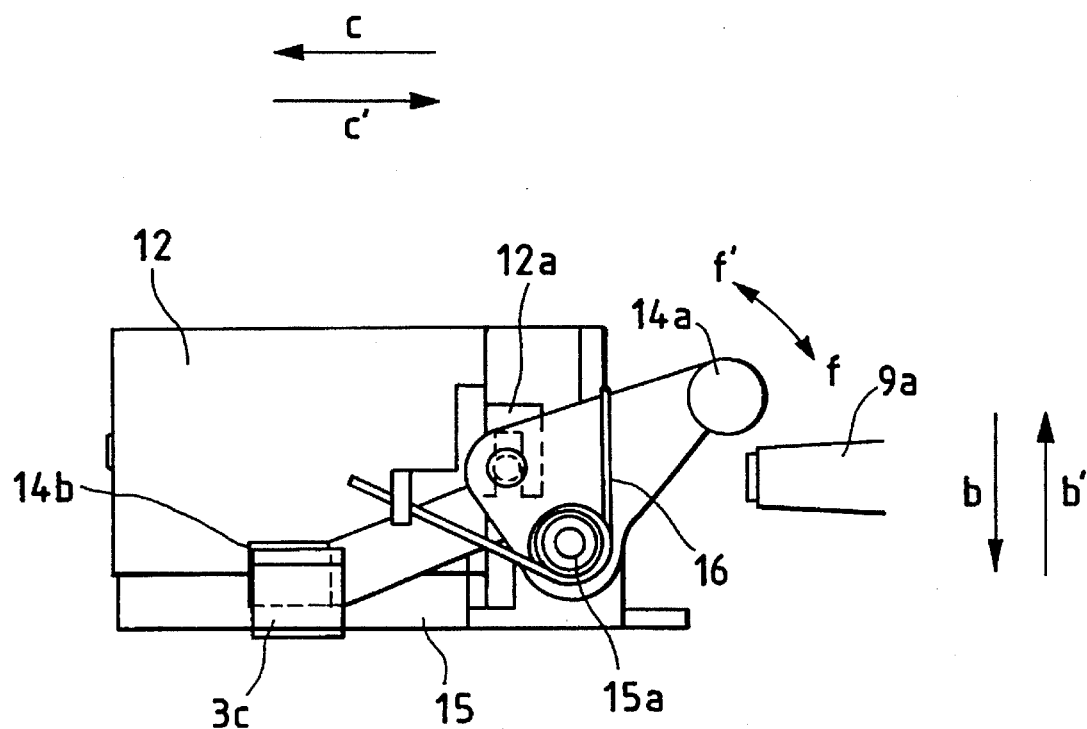
FIG. 7 is a side view of a major part of the disk cartridge loading mechanism with a cartridge loaded in the optical information recording/reproducing apparatus in the first embodiment of the present invention.

Also, a spindle motor 5 for rotating the disk is set on the chassis and a carriage 6 guided by guide rails 13 is also set on the chassis while carrying a pickup 7 including an objective lens. An external magnetic field generating device, specifically a so-called floating magnetic head 10, is provided behind the carriage 6 (ahead in the cartridge insertion direction) while being supported by a support arm 9 to be rockable in the directions of arrows d–d' about a pivot 6a and always being baised by a torsion spring 11 in the direction of arrow d. A projecting portion 9a is provided behind the support arm 9 so that during insertion or ejection of cartridge 2 a motion of the projecting portion 9a is restricted by a drive arm 14, which is driven by a solenoid 12 supported on a mounting base 15 fixed on the chassis, in the direction of arrow d', i.e., in the direction in which the floating magnetic head 7 is taken away from the disk surface. As shown in FIG. 7, the drive arm 14 is supported to be rockable in the directions of arrows f–f' about a pivot 15a set on the mounting base 15. This drive arm 14 is always biased by a torsion spring 16 in the direction of arrow f. With energization of solenoid 12, the motion restriction of support arm 9 is released to allow landing of the magnetic head 10 onto the disk 1.

Numeral 17 is an eject motor, which is energized in ejection of cartridge 2 to move the guide cam 3 in the direction of arrow a. The eject motor 17 is actuated under control of the control circuit in the ejection operation of cartridge 2. An arrangement for permitting manual forced ejection is provided for a case that some anomaly occurs in the drive device and the control system therefor so as to disable the ejection by the eject motor 17. In more detail, an insertion hole 22b is perforated through a front panel 22, a forcible ejection tool 18 is inserted through this hole to be brought into contact with a bent-down portion 3b of guide cam 3, and the guide cam 3 is forced to move in the direction of arrow a. This permits the cartridge 2 to be manually ejected.

Next described is the operation of the mechanism as so arranged. FIG. 3, FIG. 5 and FIG. 7 10 each show a state after the cartridge 2 is loaded, while FIG. 4, FIG. 6 and FIG. 8 each show a state before the cartridge 2 is loaded or after the cartridge is ejected. FIG. 5 and FIG. 6 each are a plan view to show a state in which the cartridge 2 and the holder 4 are taken out.

Figure 4:
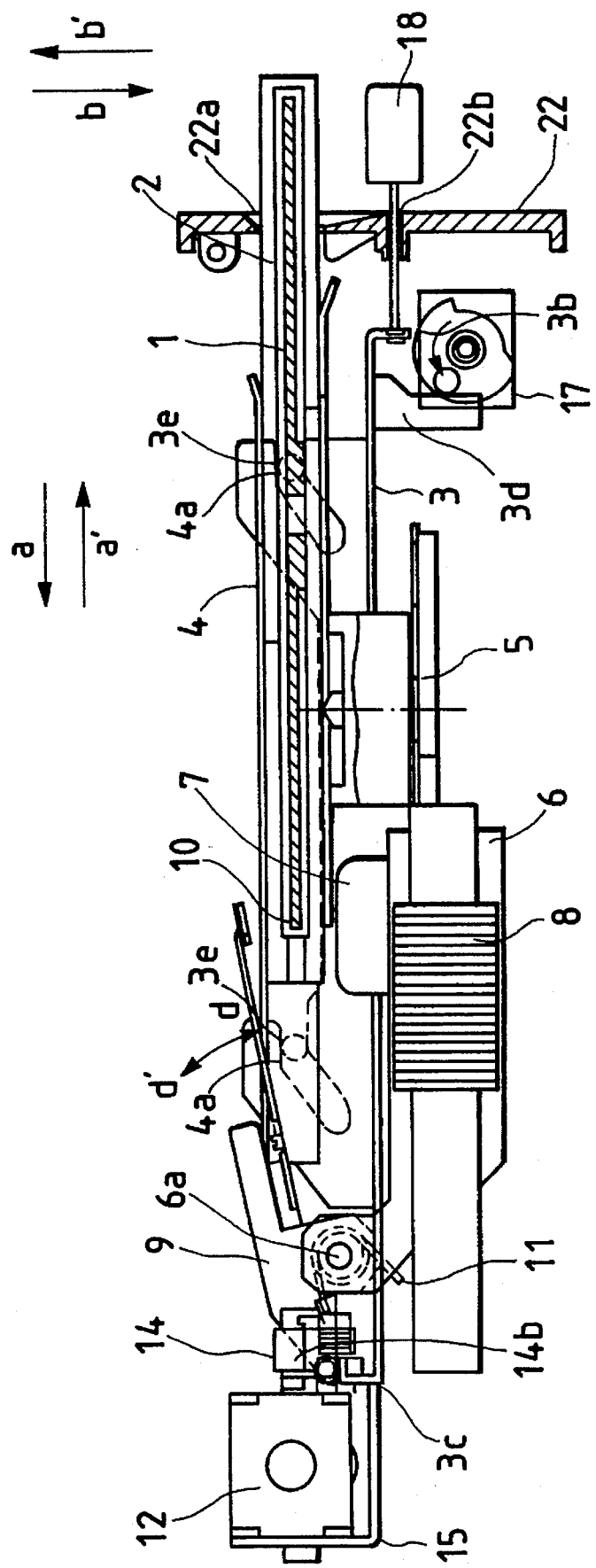
FIG. 4 is a cross-sectional view of the disk cartridge loading mechanism before cartridge loading or after cartridge ejection in the optical information recording/reproducing apparatus in the first embodiment of the present invention.
Figure 5:
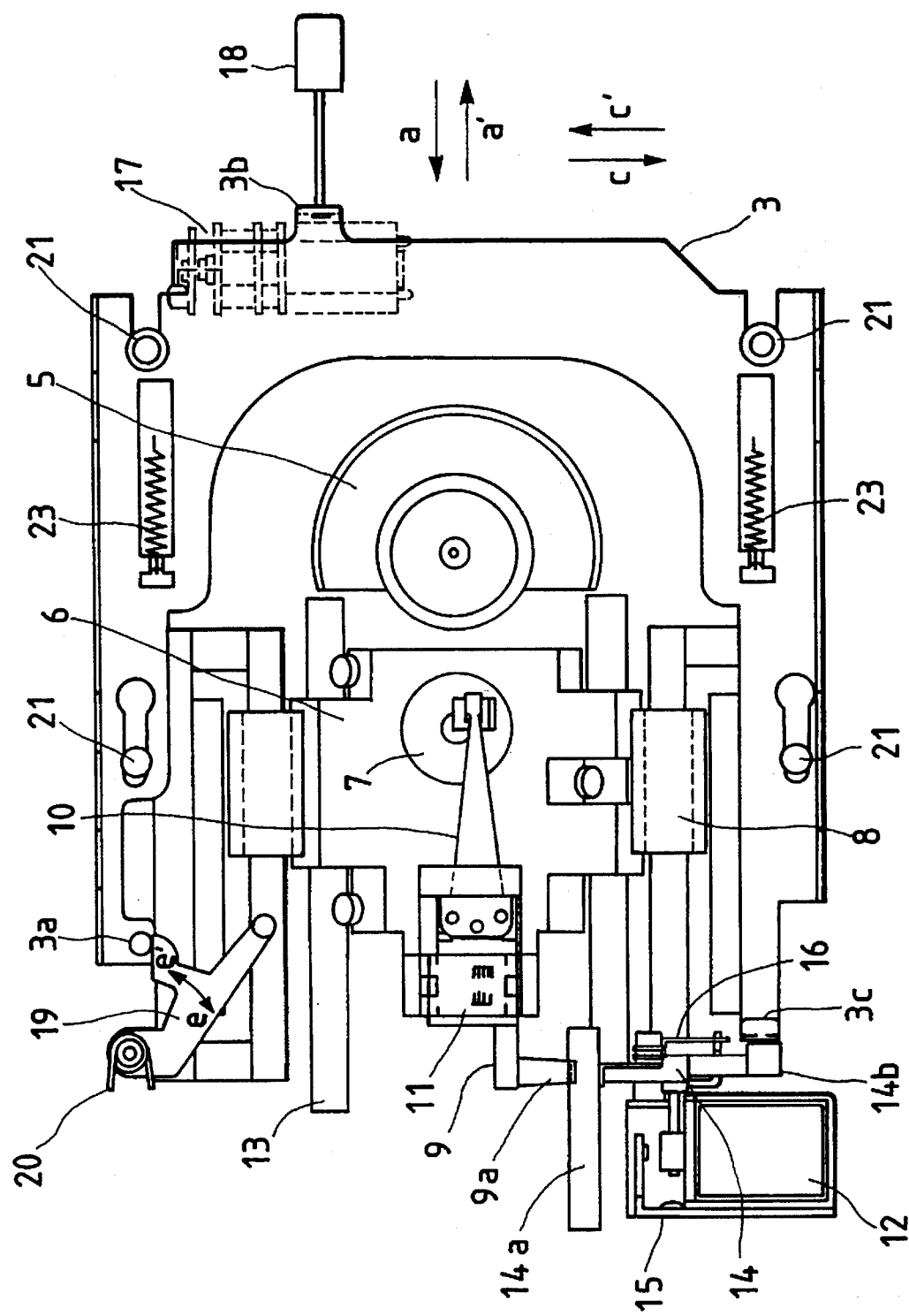
FIG. 5 is a top plan view of FIG. 3.
Figure 6:
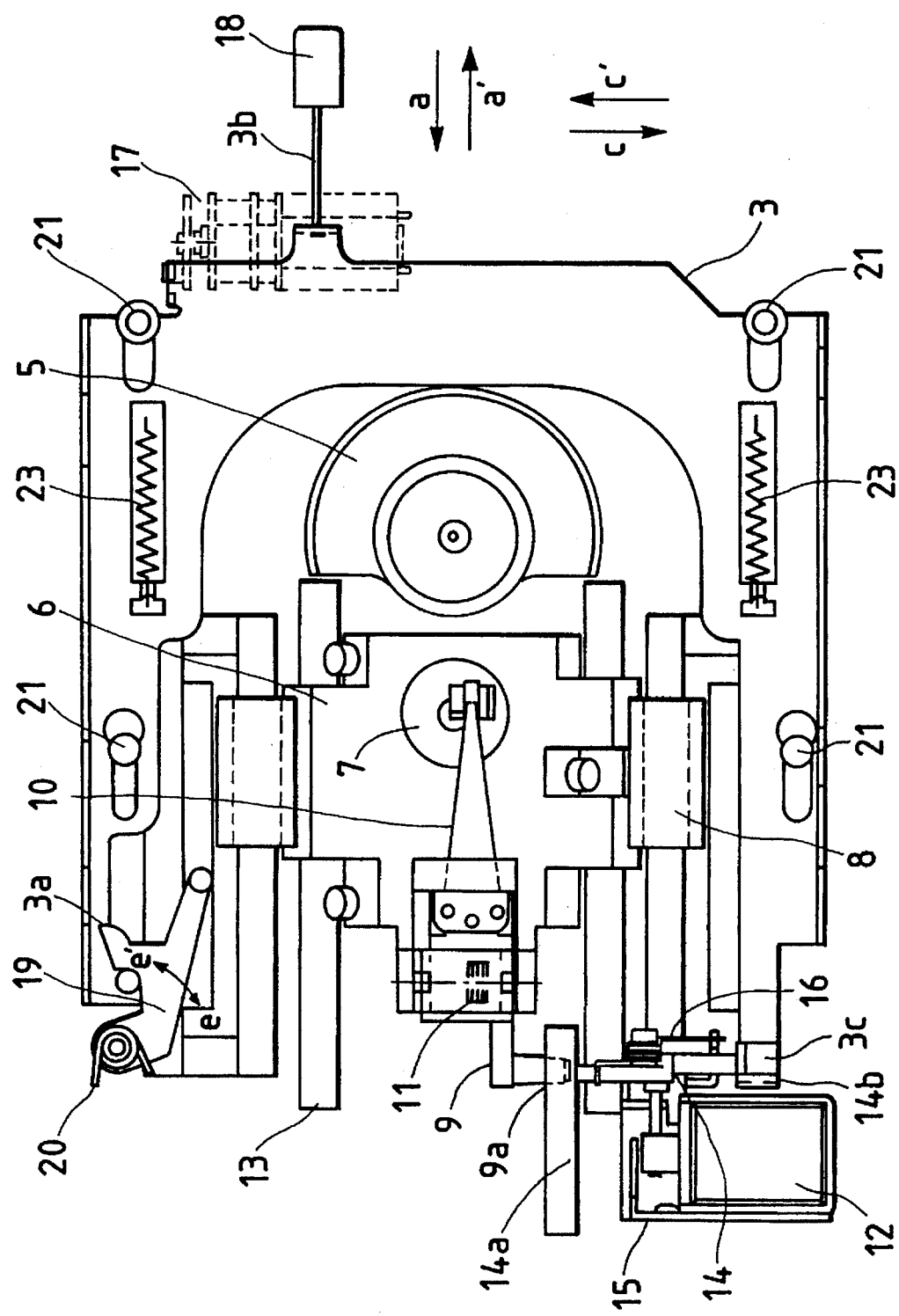
FIG. 6 is a top plan view of FIG. 4.

In loading of cartridge 2, the cartridge 2, is pressed in through the cartridge slot 22a in the front panel 22, as shown in FIG. 4, so that the cartridge leading end 2a rotates the trigger lever 19 holding the slide cam against the spring 20 about the pivot 11 in the direction of arrow e (from the state of FIG. 6 to the state of FIG. 5). This releases the holding of trigger lever 19 so as to allow the guide cam 3 to move by the spring force of spring 23 in the direction of arrow a'. On this occasion the lever provided on the holder 4 opens the shutter of the cartridge with insertion of cartridge 2, though not shown. The four rollers 4a on the sides of holder 4 are guided to engage with the slope portions 3e, two on each of the left and right sides of moving guide cam 3. Then the holder 4 is moved down in the direction of arrow b to be set at the loaded position (down position). Thus, the disk 1 is loaded on the turntable of spindle motor 5. Recording or reproduction is possible in this state (see FIG. 3 and FIG. 5).

Then the solenoid 12 is energized to pull in a plunger 12a as a driving member in the direction of arrow c, as shown in FIG. 3 and FIG. 7. On this occasion, the drive arm 14 rotates against the torsion spring 16 in the direction of arrow f', so that the drive portion 14a is set apart from the projecting portion 9a of the support arm supporting the magnetic head 10. Then the support arm 9 is biased by the torsion spring 11 in the direction of arrow d to permit the magnetic head to land on the disk 1, going into a state in which a magnetic field can be applied to a recording area on the disk.

During the landing of the magnetic head (during recording or reproducing information) the drive arm 14 is pivoted in the direction of f', so that an engaging portion 3c bent to stand at the rear end of the guide cam (or ahead in the cartridge insertion direction) comes to contact a restricting portion 14b provided on the other side opposite to the drive portion 14a of drive arm. Consequently, the restricting portion of drive arm 14 restricts a motion of the guide cam 3 in the direction of arrow a.

It is thus impossible during the landing of the magnetic head 10 that the guide cam 3 is forced to move in the direction of arrow a by inserting the forcible ejection tool 18 through the slot 22b in the front panel to be brought into contact with the engaging portion 3b of guide cam 3, preventing the manual forced ejection.

For ejecting the cartridge 2, the energization of solenoid 12 is first interrupted. When the pull-in of plunger 12a as a drive member is released, the torsion spring 16 rotates the drive arm 14 in the direction of arrow f to press down the projecting portion 9a of the support arm supporting the magnetic head 10 by the drive portion 14a. This results in rocking the support arm 9 against the torsion spring 11 in the direction of arrow d' to withdraw the magnetic head 10 from the disk 1. This means that the operation is automatically executed upon interruption of service to the drive power source so as to interrupt the energization of solenoid 12 to withdraw the magnetic head from the disk.

Figure 8:
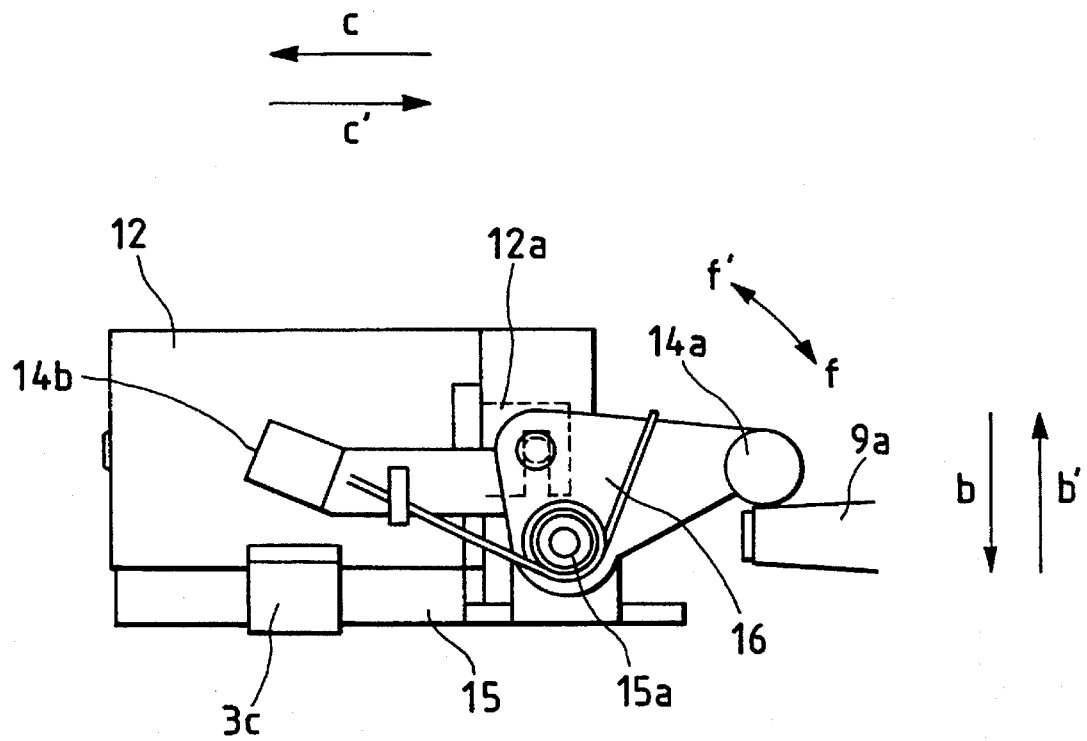
FIG. 8 is a side view of a major part of the disk cartridge loading mechanism before cartridge loading or after cartridge ejection in the optical information recording/reproducing apparatus in the first embodiment of the present invention.

In that case, the engaging portion 3c and the restricting portion 14b are separated from each other because the drive arm 14 is rotated in the direction f, as shown in FIG. 8. Consequently, the guide cam 3 released from the restriction by the restricting portion 14b can be movable in the direction of arrow a. After that, the spindle motor 5 is stopped and the eject motor 17 is actuated to rotate. The rotation of eject motor 17 drives the bent-down portion 3d in the direction of arrow a to move the guide cam 3. With the motion of guide cam 3, the holder 4 is moved in the direction of arrow b' opposite to the loading operation, so as to rise from the loading position to the insertion position. While the shutter is closed by the unrepresented lever during the operation, the cartridge 2 is pushed out of the holder 4 (returning to the state of FIG. 3). It is needless to say that the manual forced ejection using the forcible ejection tool 18 is of course possible in the state that the magnetic head is not landed, that is, in the state that the energization of solenoid 12 is interrupted.

Figure 9:
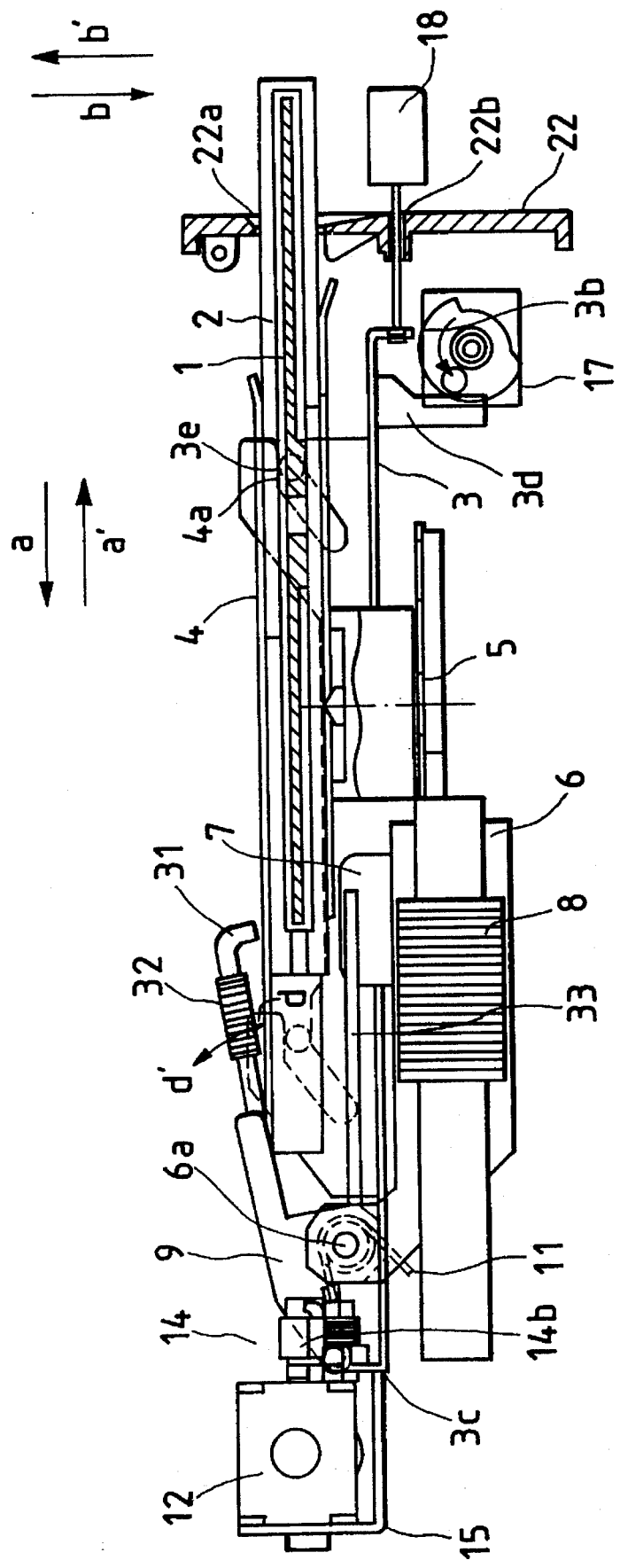
FIG. 9 is a cross-sectional view of a disk cartridge loading mechanism with a cartridge loaded in an optical information recording/reproducing apparatus in a second embodiment of the present invention.

FIG. 9 shows the second embodiment of the present invention, which is an optical information recording/reproducing apparatus using a magnetic head of the optical modulation method in place of the floating magnetic head as the external magnetic field applying device. The present embodiment in FIG. 9 is different from the first embodiment in the arrangement of the external magnetic field applying device. Namely, the present embodiment is characterized by such an arrangement that a support arm 9 is rockable about a pivot 6a set behind a carriage similarly as in the above embodiment, an upper yoke 31 is supported on the support arm 9, a coil 32 is wound around the upper yoke 31, the upper yoke 31 forms a magnetic circuit together with a lower yoke 33 provided in the vicinity of an optical pickup 7, and the coil 32 is energized to apply a magnetic field.

This external magnetic field applying device must also be arranged to withdraw from the disk 1 by rotating the support arm 9 upon insertion or ejection of cartridge 2 in order to move in synchronism with the carriage.

Figure 10:
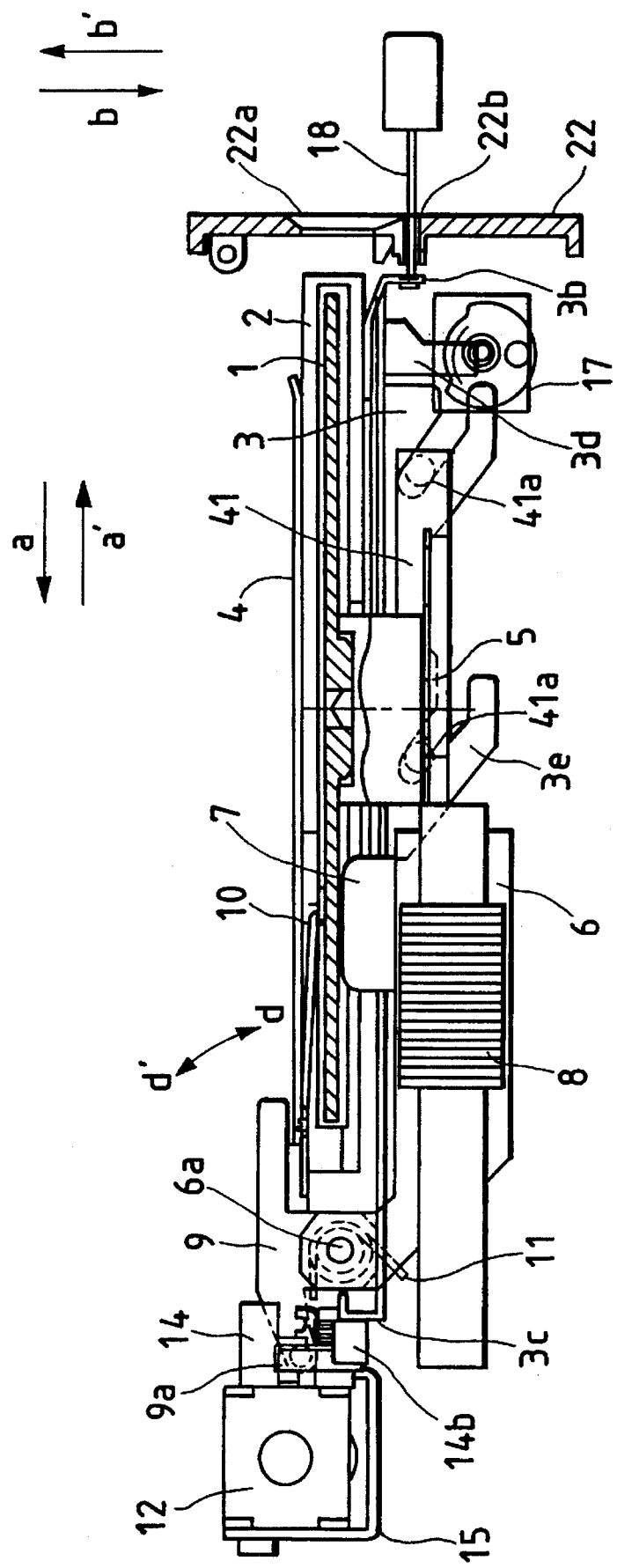
FIG. 10 is a cross-sectional view of a disk cartridge loading mechanism with a cartridge loaded in an optical information recording/reproducing apparatus in a third embodiment of the present invention.
Figure 11:
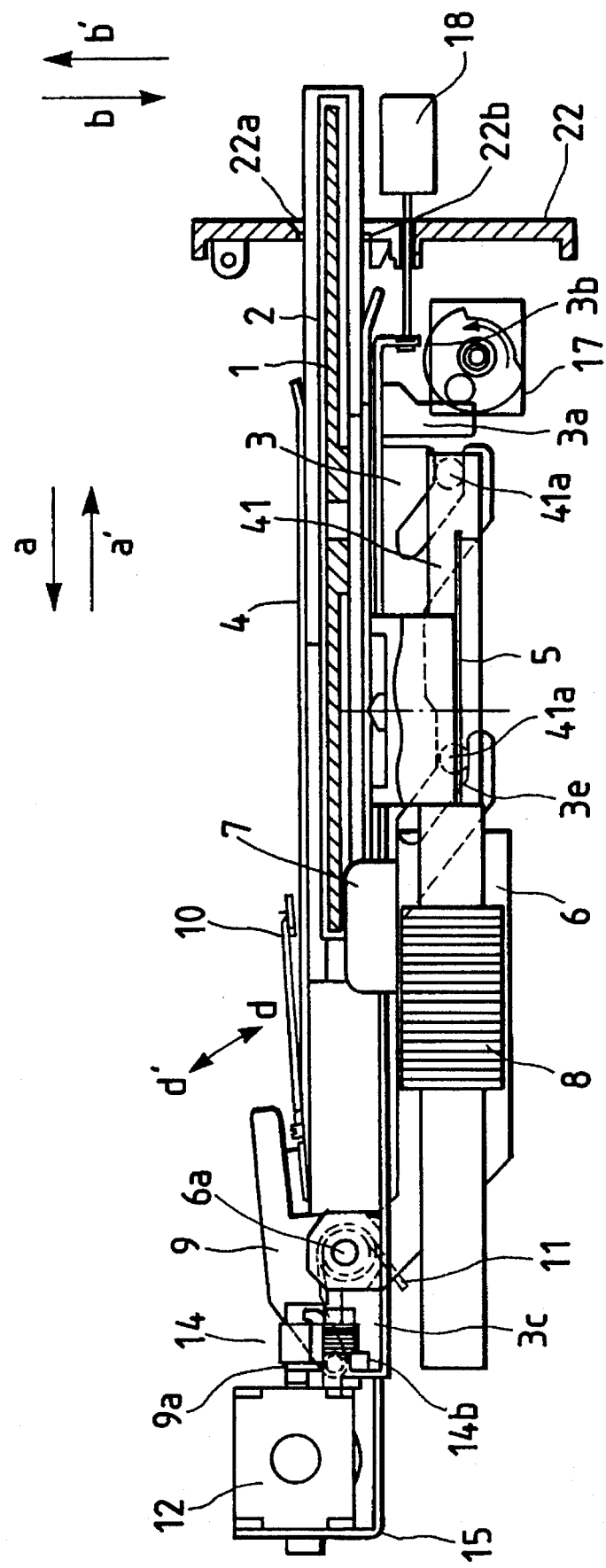
FIG. 11 is a cross-sectional view of the disk cartridge loading mechanism before cartridge loading or after cartridge ejection in the optical information recording/reproducing apparatus in the third embodiment of the present invention.

FIG. 10 and FIG. 11 show an optical information recording/reproducing apparatus in the third embodiment of the present invention. The third embodiment shown in FIG. 10 and FIG. 11 is different from the first embodiment in which the disk 1 is loaded or unloaded by descending the cartridge 2, in that the disk 1 is loaded by moving the cartridge 2 only in the horizontal direction (in the directions of arrows a–a') and moving the spindle motor 5 up and down in the directions of arrows b–b'. In the third embodiment, the magnetic head 10 as the external magnetic field applying device must also be withdrawn upward upon insertion of cartridge 2. Thus, the support arm 9 must be rotated by the solenoid 12 similarly as in the first embodiment. The following describes differences between the third embodiment and the first embodiment. For loading the cartridge 2, the cartridge 2 is inserted and pressed in through the cartridge slot 22a in the front panel 22, which releases the restriction of the trigger lever holding the slide cam 3 to move the guide cam 3 in the direction of arrow a'. On this occasion a lever provided on the holder 4 opens a shutter of cartridge with insertion of cartridge 2, though not shown. With the movement of the guide cam 3, rollers 41a set on a spindle holder 41 supporting the spindle motor 5 are guided into slope portions 3e provided in the guide cam 3 so that the spindle holder 41 ascends in the direction of arrow b'. When the spindle holder 41 reaches a loading position (up position) thereof (FIG. 10), a disk 1 is loaded on a turntable of spindle motor 5 to become ready for recording or reproduction. Then, the solenoid 12 is energized to bring the magnetic head 10 into a landing position, which is the same as in the first embodiment. It is impossible in this state that the guide cam 3 is forced to move in the direction of arrow a by inserting the forcible ejection tool 18 through the slot 22b in the front panel to be brought into contact with the engaging portion 3b of guide cam 3. That is, the manual forced ejection is inhibited in this state, which is also the same as in the first embodiment.

Figure 12:
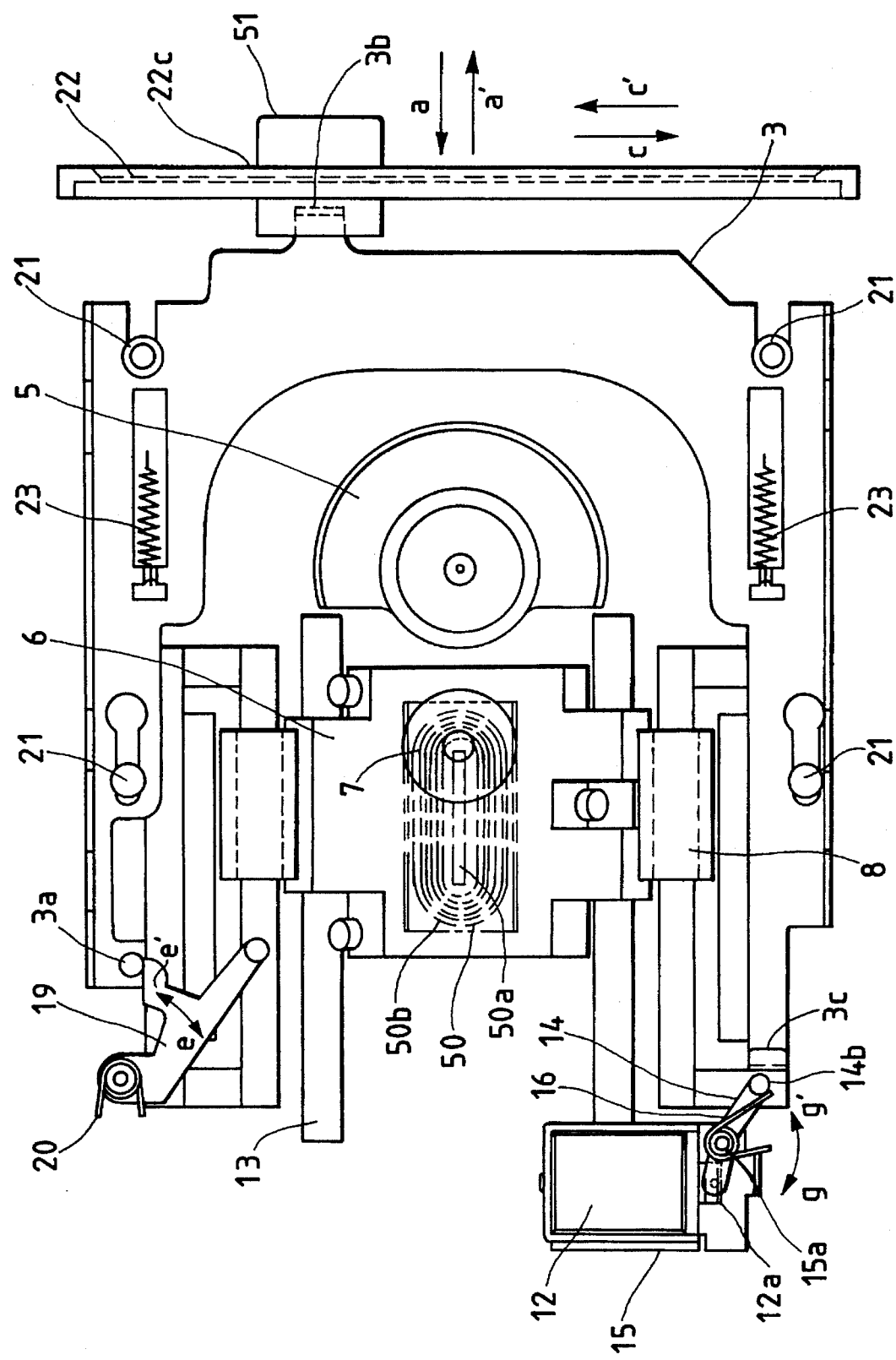
FIG. 12 is a plan view of a disk cartridge loading mechanism with a cartridge loaded in an optical information recording/reproducing apparatus in a fourth embodiment of the present invention.
Figure 13:
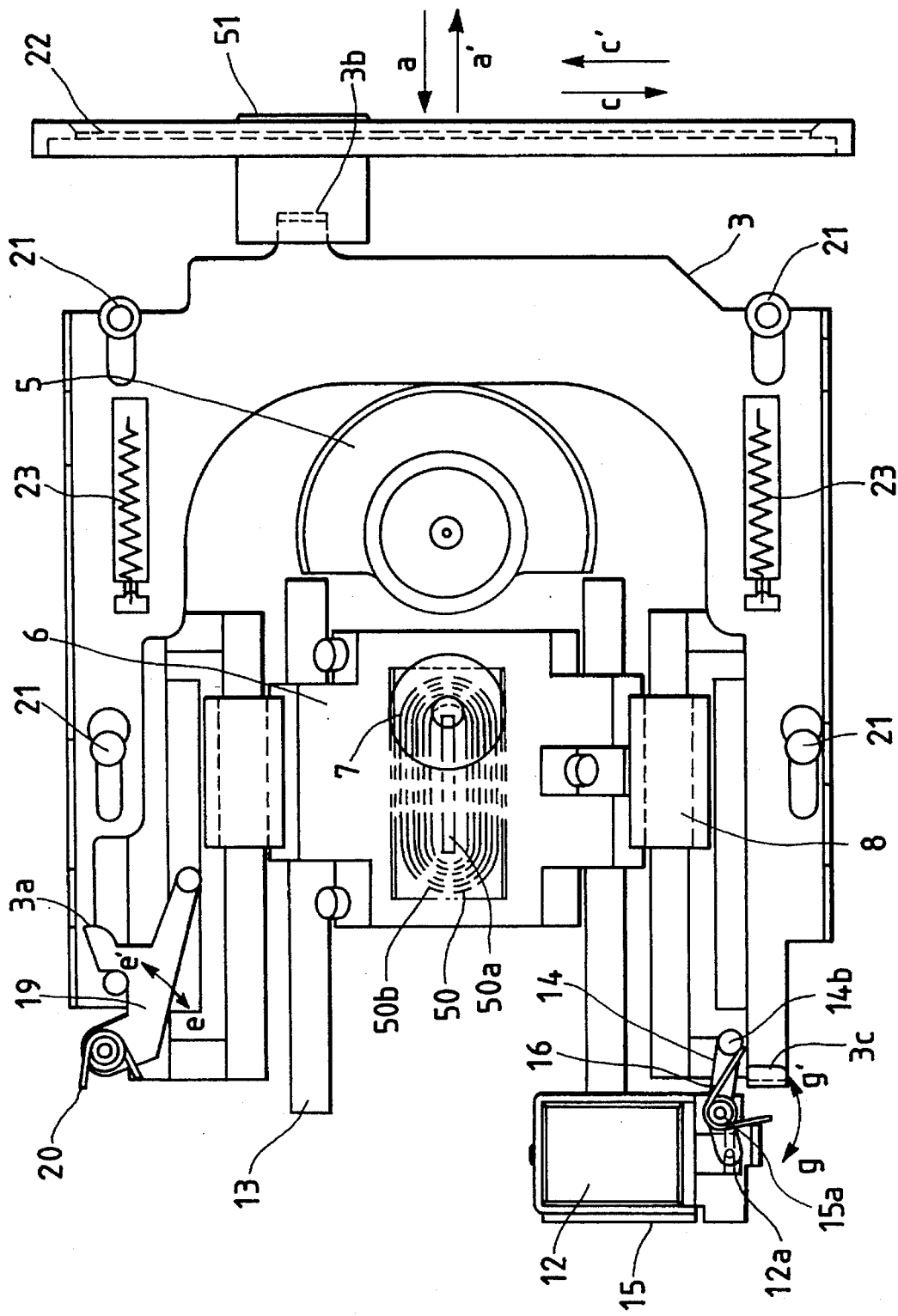
FIG. 13 is a plan view of the disk cartridge loading mechanism before cartridge loading or after cartridge ejection in the optical information recording/reproducing apparatus in the fourth embodiment of the present invention.

FIG. 12 and FIG. 13 show an optical information recording/reproducing apparatus in the fourth embodiment of the present invention. The fourth embodiment does not employ the floating magnetic head as the external magnetic field applying device but employs a field applying device of the optical modulation method. Further, the ejection of the disk cartridge is manually carried out in the fourth embodiment.

In the fourth embodiment the external magnetic field applying device 50 is fixed on a cartridge holder and is opposed to an optical pickup 7 with a disk in between. The external magnetic field applying device 50 is so arranged that a coil 50b is wound around a yoke 50a as a core and the coil 50b is energized to apply a magnetic field onto a disk surface.

As for the manual ejection different from that in the first embodiment, the manual ejection is executed by manually pressing an ejection button 51 provided on the front panel 22 so as to eject the cartridge. Specifically, the ejection button 51 is fixed on a bent portion 3b of guide cam 3. The ejection button 51 is projecting out through an aperture on the front panel 22 outside the apparatus when the cartridge is loaded, because the guide cam 3 is drawn by tension coil springs 23 toward the front panel 22. For ejecting the cartridge, a user presses the ejection button 51 into the apparatus to move the guide cam 3 in the direction of arrow a, whereby the cartridge is ejected. This arrangement obviates the eject motor as employed in the first embodiment. A series of operations for loading the cartridge are the same as those in the first embodiment.

Provided as a member for restricting a motion of the guide cam 3 is a drive arm 14 which is driven by the solenoid supported by a mounting base 15 fixed on the chassis. As shown in FIG. 12, the drive arm 14 is supported to be rockable about a pivot 15a set on the mounting base 15 in the directions of arrows g–g' and is always biased by a torsion spring 16 in the direction of arrow g'. A motion of the guide cam 3 is restricted or freed by a contact portion 14b of the drive arm with the presence or absence of power supply to the solenoid 12.

The operation of the above arrangement is next described.

FIG. 13 shows a state before a cartridge is loaded or after the cartridge is ejected, in which the drive lever 14 is rotated by the torsion spring 16 in the direction of arrow g' with no power supply to the solenoid 12. Thus, the contact portion 14b is kept away from the bent portion 3c of the guide cam. Since a motion of the guide cam is not restricted in the directions of arrows a–a', cartridge loading or ejection is free with movement of the guide cam. The loading operation is the same as in the first embodiment.

For recording or reproducing information with a disk, the solenoid 12 is energized through an unrepresented control circuit, as shown in FIG. 12, so that the plunger 12a as a driving member is pulled in in the direction of arrow c' so as to pivot the drive arm 14 against the torsion spring 16 in the direction of arrow g. Then the bent portion 3c of guide cam 3 comes into contact with the contact portion 14b of drive arm, which restricts the motion of guide cam 3 in the direction of arrow a so as to disable a press-in operation of the ejection button during recording or reproduction.

For ejecting the cartridge, the power supply to the solenoid 12 is first interrupted. Then the plunger 12a as a driving member is freed from the pull-in state, so that the drive arm 14 is rotated by the torsion spring 16 in the direction of arrow g' to release the movement restriction of the guide cam 3. Thus, the cartridge can be ejected by pressing the ejection button 51. In case power supply is interrupted to the drive power source, the power supply to the solenoid 12 is also automatically interrupted to allow the ejection, of course.

The present invention was described above with respect to some embodiments. It should be noted that the present invention is not limited to the above embodiments but various effective changes can be, of course, made based on the technical idea of the present invention.

What is claimed is:

1. An optical information recording and/or reproducing apparatus for effecting at least one of recording information on and reproducing information from an optical information recording medium enclosed in a cartridge, using an optical beam, said apparatus comprising:

magnetic field applying means for applying a magnetic field to the recording medium when recording of information is effected on the recording medium;

moving means for causing said magnetic field applying means to approach a surface of the recording medium and for moving said magnetic field applying means away from the recording medium;

a holder for holding said cartridge to be inserted into said apparatus;

an optical head for irradiating the optical information recording medium in said cartridge with the optical beam to record and/or reproduce information; and a slide plate adapted to move within said apparatus so as to eject said cartridge held by said holder from said apparatus, wherein said moving means is adapted to engage a portion of said slide plate to render movement of said slide plate impossible when said moving means causes said magnetic field applying means to approach the surface of the recording medium, to effect recording and/or reproducing of information with said optical head.

2. An apparatus according to claim 1, wherein said holder moves in the vertical direction with the movement of said slide plate.

* * * * *

UNITED STATES PATENT AND TRADEMARK OFFICE
CERTIFICATE OF CORRECTION

PATENT NO. : 5,537,376
DATED : July 16, 1996
INVENTOR(S) : Susumu IKUMA

It is certified that error appears in the above-indentified patent and that said Letters Patent is hereby corrected as shown below:

COLUMN 1:

Line 59, "solenoid" should read --solenoid,--.

COLUMN 2:

Line 27, "of a" should read --of the--; and
Line 29, "floppy" should read --a floppy--.

COLUMN 3:

Line 11, "the" should read --of the--.

COLUMN 4:

Line 28, "baised" should read --biased--;
Line 58, "10" should be deleted; and
Line 65, "2, is" should read --2 is--.

COLUMN 5:

Line 26, "information)" should read --information),--.

UNITED STATES PATENT AND TRADEMARK OFFICE
CERTIFICATE OF CORRECTION

PATENT NO. : 5,537,376        Page 2 of 2
DATED : July 16, 1996
INVENTOR(S) : Susumu IKUMA It is certified that error appears in the above-indentified patent and that said Letters Patent is hereby corrected as shown below:

<u>COLUMN 6</u>:

Line 42, "of" should read --of the--.

<u>COLUMN 7</u>:

Line 47, "in in" should read --in--.

Signed and Sealed this

Eleventh Day of February, 1997

Attest:

BRUCE LEHMAN

*Attesting Officer*      *Commissioner of Patents and Trademarks*